F. C. PERKINS.
METALLIC INCUBATOR.
APPLICATION FILED AUG. 28, 1908.

938,271.

Patented Oct. 26, 1909.

WITNESSES:
D. Gurnee
E. W. Carroll

INVENTOR:
Frank C. Perkins
by Oscar Adams
his atty.

UNITED STATES PATENT OFFICE.

FRANK C. PERKINS, OF BUFFALO, NEW YORK, ASSIGNOR TO CYPHERS INCUBATOR COMPANY, OF BUFFALO, NEW YORK, A CORPORATION OF NEW YORK.

METALLIC INCUBATOR.

938,271. Specification of Letters Patent. Patented Oct. 26, 1909.

Application filed August 28, 1908. Serial No. 450,756.

*To all whom it may concern:*

Be it known that I, FRANK C. PERKINS, a citizen of the United States, and resident of Buffalo, in the county of Erie and State of New York, have invented certain new and useful Improvements in Metallic Incubators, of which the following is a specification.

This invention relates to incubators, and the object is to produce a cheap and efficient structure of this description, which is fireproof and extremely unlikely to get out of order.

The apparatus shown herewith utilizes as the thermic element the heat generated by an electric current passing through a resistance.

Figure 1:
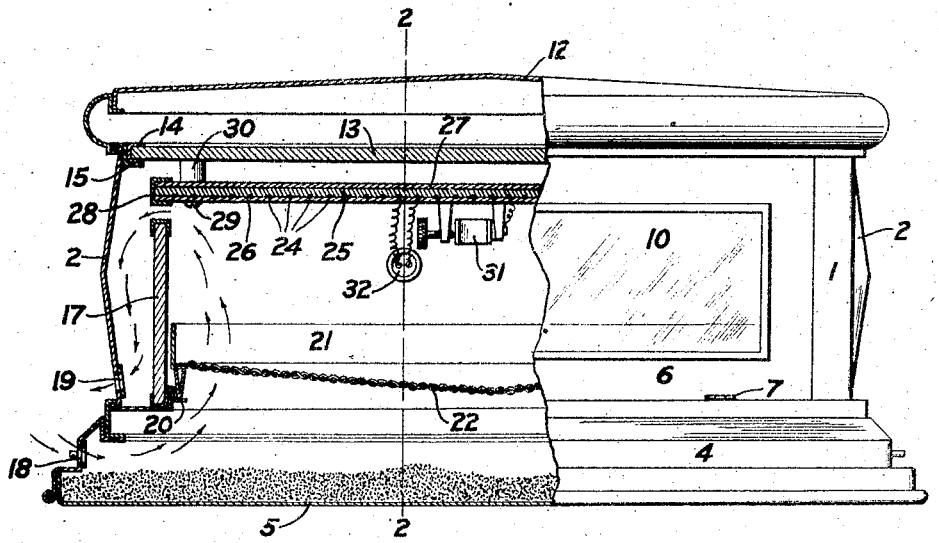
Figure 2:
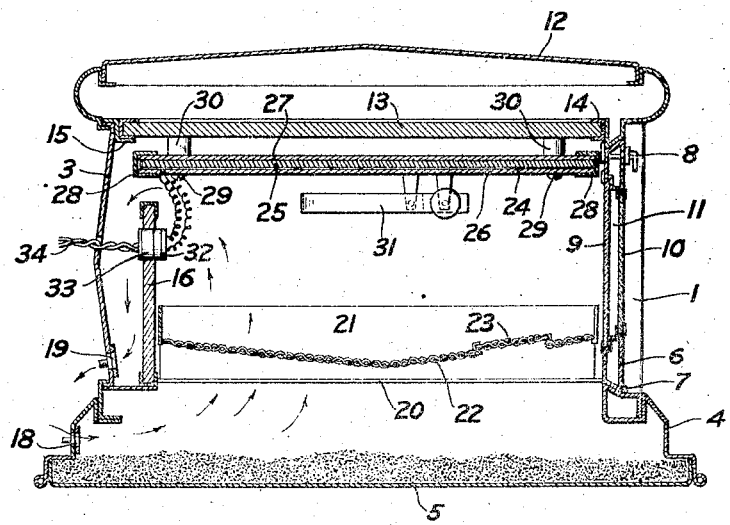

In the drawings: Figure 1 is a longitudinal central vertical section of the incubator; and Fig. 2 is a transverse section on the line 2—2 of Fig. 1.

In the present embodiment of the invention, all the parts are made of sheet metal, suitably clamp-jointed or soldered together. The casing 1 is open at the front, and has closed sides 2, 2 and back 3. The sides and back form a single structure which rests on a base 4, and said base covers a removable tray 5 that constitutes the bottom of the brooder chamber.

The door for closing the front and affording access to the egg chamber, consists of a metal frame 6, hinged at its bottom edge 7, and fastened shut by means of a suitable latch 8 at the top. Said frame contains two panes of glass 9 and 10, flush with its inner and outer faces, respectively, and having between them an air-space 11. The latter forms a non-conductor for the heat contained in the egg chamber. The edges of the door frame 6 are beveled inwardly (Fig. 2), and thus the door may be more tightly closed than if said edges were square.

The top 12 of the incubator is removable, and rests in a socket or depression in the rolled upper edges of the sides, as shown. Below the top 12, and extending across the whole apparatus, is a plate 13, made of a substance which is a poor conductor of heat, such as asbestos. The edges of this plate have a metallic binding 14, and rest upon a ledge 15 that extends around the inside of the casing. Similar non-conducting plates 16 and 17, 17 are fixed at the back and ends, respectively, and a slight distance therefrom.

The spaces between said plates and the sides of the incubator constitute flues or channels for the circulation of air, as shown by the arrows. Air enters the casing through perforated slides 18 and passes upward and over the partitions 16 and 17, and finds an exit through other perforated slides 19. The slides 18 and 19 may be moved longitudinally to cut off the air-current as desired.

The egg tray is supported in guides 20, and consists of a rectangular metal frame 21 that has a wire-netting bottom 22. The eggs are placed on the latter in the usual manner, and the tray may be withdrawn through the door 6. A trap door 23 is provided to let the hatched chicks fall into the tray 5.

It is obvious from the drawings that the air circulating through the incubator must pass through the egg tray in order to find an exit. The eggs are thus certain to be thoroughly ventilated.

The heating device used in connection with this invention consists of a coil of fine wire that forms a resistance to the passage of an electric current, and therefore becomes hot when a current is passed through it. Said coil 24 is fixed on the under side of an asbestos tablet or plate 25, and is covered by a thinner sheet of non-conducting material 26. A similar sheet 27 may be laid on the upper side of the plate 25, and the whole may be edged or bound with a channel-shaped metallic strip 28. Studs 29, projecting through sleeves 30, support the plates 25 etc. at a slight distance below the plate 13.

A thermostat 31 of any suitable type, is inserted in the coil 24 and supported on the under side of the plate 26. When the temperature rises beyond a predetermined limit, the thermostat breaks the circuit through the coil 24 in the usual manner, and closes said circuit when the temperature drops.

In order that the plate 25 and coil 24 with attached parts, may be removed through the top of the incubator with the plate 13, the terminals of the said coil end in a plug 32 that may be readily inserted in or removed from a socket 33. The latter is fixedly supported in the partition 16, and leads 34 extend therefrom to a source of electric current.

It will be seen that the heat in the incubator is above the eggs lying in the tray, and is reflected downward upon said eggs by the asbestos plate 25.

What I claim is:—

1. A metallic incubator, consisting of a hollow base having air inlet openings; a middle portion constituting the sides of the incubator open at the top and bottom, and resting on said base, and having air outlets adjacent to the bottom of the sides; walls within said middle portion, spaced from the said sides, and having air passages over the tops of the walls; a metallic door in one of the said sides; a hollow metallic cover resting upon said sides; an impervious heat insulating plate supported under said cover; an electric heater supported below said plate; and an egg tray supported under said heater and above said base.

2. A metallic incubator, consisting of a hollow base having air inlet openings; a middle portion open at the top and bottom, and constituting the sides of the incubator, resting on said base, and having air outlets adjacent to the bottom of the sides; heat insulating walls within said middle portion spaced from said sides, and having air passages over the tops thereof; a metallic door in one of said sides; a hollow metallic cover resting upon said middle portion; an impervious heat insulating plate supported under said cover; an electric heater supported below said plate and an egg tray supported under said heater and above said base.

FRANK C. PERKINS.

Witnesses:
E. J. PLUMLEY,
H. L. OSGOOD.